United States Patent [19]
Foldesi et al.

[11] Patent Number: 5,522,200
[45] Date of Patent: Jun. 4, 1996

[54] CONTINUOUS MOTION SEALER

[75] Inventors: Steven Foldesi; Steven Foldesi, Jr., both of Laval, Canada

[73] Assignee: Nestec Machine Systems Ltd., Laval, Canada

[21] Appl. No.: 386,450

[22] Filed: Feb. 10, 1995

[51] Int. Cl.⁶ ............... B65B 57/08; B65B 7/28; B65B 51/14; B67B 5/00
[52] U.S. Cl. ............... 53/75; 53/76; 53/329.4
[58] Field of Search .................. 53/329, 329.2, 53/329.3, 329.4, 329.5, 478, 297, 298, 306, 308, 201, 75, 76

[56] References Cited

U.S. PATENT DOCUMENTS

| | | | |
|---|---|---|---|
| 1,748,960 | 3/1930 | Risser | 53/308 X |
| 3,309,838 | 3/1967 | Wilhere | 53/306 X |
| 3,345,797 | 10/1967 | Von Stoeser | 53/297 X |
| 3,471,992 | 10/1969 | Amberg et al. | 53/478 |
| 3,509,682 | 5/1970 | Logemann | 53/298 X |
| 3,590,554 | 7/1971 | Carter | 53/329.2 X |
| 3,621,637 | 11/1971 | Sternau | 53/329 |
| 3,672,113 | 6/1972 | Andra | 53/39 |
| 3,753,582 | 1/1974 | Willvonsender | 53/67 |
| 3,882,660 | 5/1975 | Sterling | 53/308 |
| 3,908,340 | 9/1975 | Erhart | 53/307 |
| 3,939,627 | 2/1976 | Mermelstein | 53/329.3 |
| 4,099,361 | 7/1978 | Dix et al. | 53/201 X |
| 4,866,913 | 9/1989 | Rebischung | 53/478 |
| 4,941,306 | 3/1990 | Pfaffmann et al. | 53/306 |
| 4,974,392 | 12/1990 | Mondini | 53/287 |
| 4,989,393 | 2/1991 | Sell et al. | 53/299 |
| 4,991,375 | 2/1991 | Raque et al. | 53/329 |
| 5,272,854 | 12/1993 | Ye et al. | 53/329.2 |

*Primary Examiner*—Horace M. Culver
*Attorney, Agent, or Firm*—Temko and Temko

[57] ABSTRACT

A continuous motion sealer of a type typically employed for applying metallic foil seals to the mouths of containers for fluid comestibles is disclosed. The device includes means for cutting a flat seal of predetermined profile from a roll-supplied heat activated material, and transport the seal to the containers or other parts following which it is heat sealed. Improved camming means is provided which enables the sealing heater to engage a seal in the absence of other than vertical motion. A punch and die assembly includes a programmable electronic material advance mechanism. Each sealing head assembly includes an electronic band heater and thermocouple, as well as a vacuum pickup for individual seals. The thermocouple communicates with a separate sealing head temperature controller, programmable with regard to temperature setting, and an alarm connected to a system shutdown in the event of failure. Means is provided to accommodate containers of differing heights, the same means providing for the lowering of the containers away from the heated sealing heads when operation is interrupted. Two multiple position rotary electrical unions are provided. One supplies power to the heaters, and the other connects temperature sensors to the heat controller. Operation is interrupted by an air operated cylinder which prevents heat damage to containers being sealed.

7 Claims, 8 Drawing Sheets

CONTINUOUS MOTION SEALER

BACKGROUND OF THE INVENTION

This invention relates to a so-called in-line sealer of a type commonly used to apply heat seals to the upwardly facing openings in containers as an in-line operation.

Devices of this general type typically include a means for feeding a container-engaging pocket wheel which conveys the line of containers in a circular path during which time overlying vacuum heads receive a usually circular foil seal having a thermoplastic adhesive from a supply source and apply it to overlie the mouth of the container. The containers progress through a heated area which activates the adhesive, for effecting a seal on the container mouth, as the vacuum in the head is released, following which the containers are transferred to another moving means for transferring the now sealed containers to another location. Reference is made to my prior U.S. Pat. No. 4,816,110 granted Mar. 28, 1989, and my joint U.S. Pat. No. 4,719,739 granted Jan. 19, 1988 which discloses the above-described structure.

In accordance with the earlier patent, the sealing head picks up an individual seal from a source of supply and transfers it to the mouth of the container. Dwell means is provided to allow the vacuum head to dwell momentarily at the supply point without interrupting the continuous movement of the container. In the latter patent, the disclosed device includes separate supply means in the form of a vertical stack associated with each of the vacuum heads at a location which accesses the lowermost seal in the stack to the vacuum head. In both cases, heat is supplied externally by passing the containers through a heated area or tunnel.

While not without substantial utility, both of the above-described devices are not without significant shortcomings. In the case of a stacked seal supply, the supply must be manually replaced after a relatively short period of time, resulting in periodic shutdown. Normally, there is a stack associated with each head, and the usual practice is to replace all of the stacks at the same time.

A further problem has existed in the manner in which individual seals are picked up from the seal supply source. The prior art includes means for holding arcuate movement of the sealing head momentarily at the instant the seal is engaged. However, the prior art means does allow a small degree of radial movement which occasionally results in offset seals.

The use of a heated area or enclosure to activate the thermoplastic adhesive on the seals is relatively inefficient, since a much larger area adjacent the containers must be heated, and much of the heat is not utilized for heating the seals. Further, it is relatively difficult to maintain a uniform minimum temperature over the entire heated area. Still another shortcoming lies in the difficulty in adjusting the device to accommodate containers of differing heights which often can vary as much as four inches. Still another shortcoming lies in the absence of provision for sensing the failure of one or more functions of the device while it is continuously in operation, resulting in the production of defectively sealed containers, or containers passing through the device without seals.

SUMMARY OF THE INVENTION

Briefly stated, the present invention contemplates the provision of an improved continuous motion in-line sealer, in which the above-mentioned problems have been eliminated, or substantially ameliorated.

To this end, the disclosed device includes an air-actuated die cutting assembly adapted to cut a specific sealing material to a specified profile and delivers it to the heating head. The assembly includes a precision programmable electronically actuated motion advance mechanism. The entire assembly slides out from the device to facilitate material threading and setup. The punch and die sub-assembly is unitized for easy removability, facilitating changeover and maintenance.

The external heat chamber of the prior art constructions is eliminated. Instead, each of the vacuum heating heads which pickup and apply the seals include an individual band heater with individual temperature sensor and controller. Power is supplied through a rotary electrical union. A second union interconnects the temperature probes of the heads with the respective temperature controllers. Emergency interruption of operation is provided through the use of an air-operated clutch and brake. A hand wheel and safety circuit interlock provide for startup and maintenance operations.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
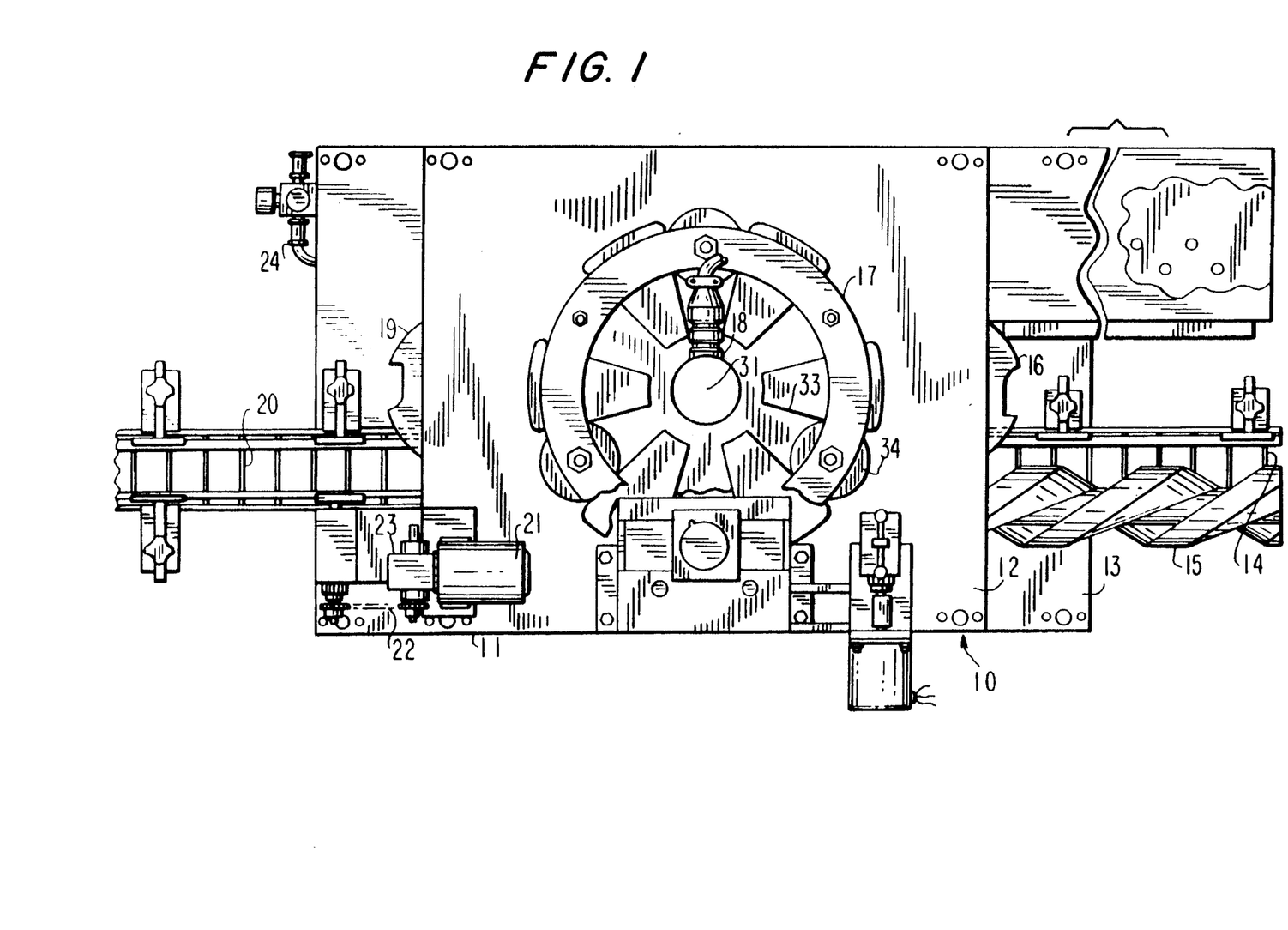
FIG. 1 is a schematic top plan view of an embodiment of the invention.

In accordance with the invention, and with reference to FIG. 1 in the drawing, the device, generally indicated by reference character 10 comprises broadly: a main frame 11 including first and second horizontal platforms 12 and 13. An input belt element 14 cooperates with a lead screw 15 to space incoming containers for entry into an input pocket wheel 16 prior to engagement with a main pocket wheel 17 on a turret element 18. In a manner similar to that disclosed in either of the two above-mentioned patents, after sealing, the containers progress to an output pocket wheel 19 and then to an output conveyor 20 which transports the sealed containers to another location. A prime mover 21 drives a gear train 22 including a pneumatically operated clutch 23 connected to an air supply 24 for interrupting movement of the above-described structure upon the occasion of a shutdown.

The vertical turret element 18 has an axis of rotation 31 coaxially positioned with respect to that of the main pocket wheel 17 which forms pockets 33 for containers 34. A seal supply element 36 is positioned in the area which is not traversed by the containers, and as will more fully appear, it includes a punch and die means which cuts seals of desired profile from a continuous web and positions the same so as to be picked up under vacuum by one of a plurality of vacuum heads.

Figure 2:
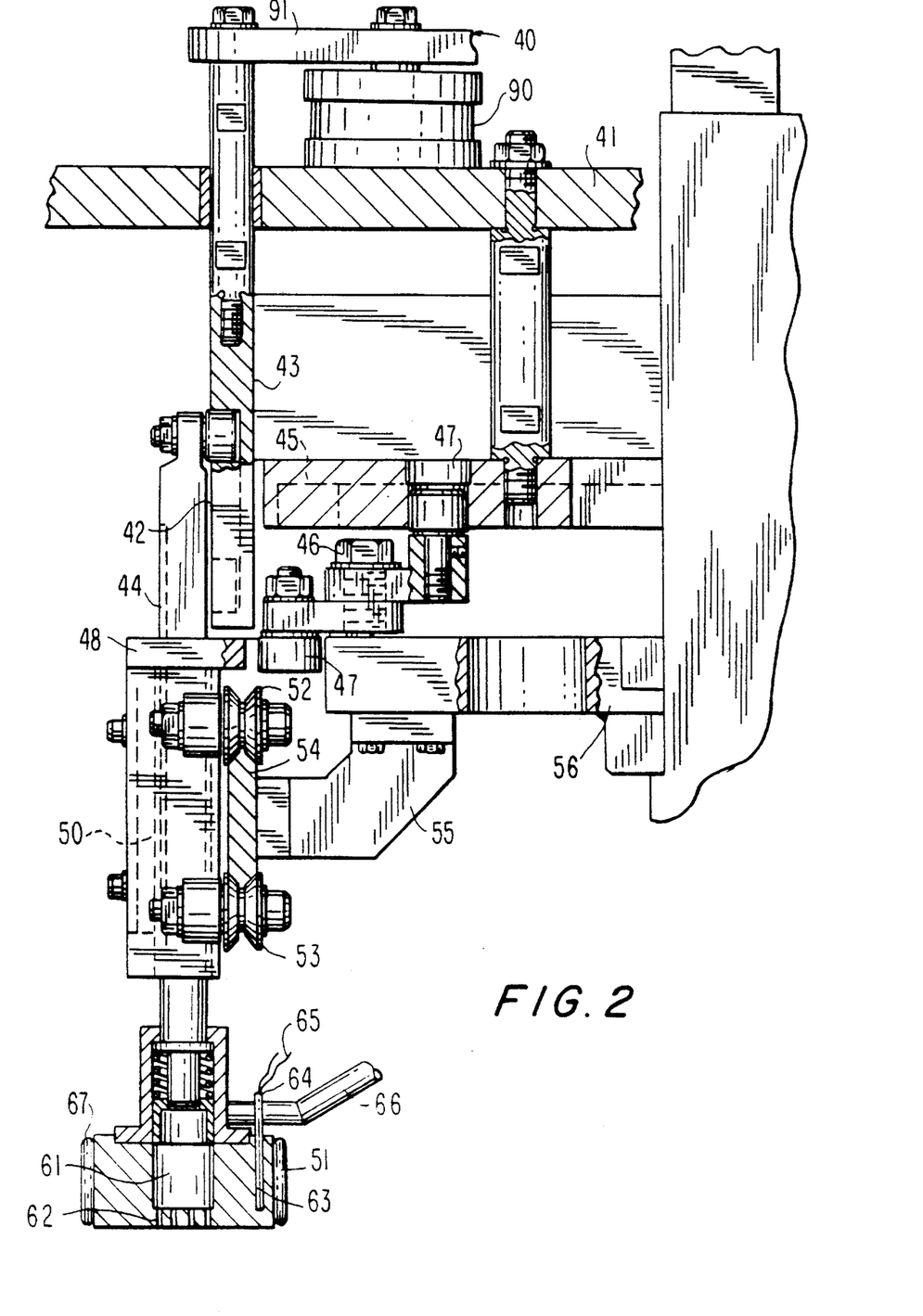
FIG. 2 is an enlarged fragmentary vertical sectional view, partly in elevation, showing a heating station assembly.

Referring to FIG. 2, there is illustrated an individual vacuum head station, generally indicated by reference character 40, it being understood that in the disclosed embodiment, there are six such stations in total. Each head mechanism is supported from a horizontal member 41 which comprises part of the turret, which mounts a lifting element 42 which includes a reciprocating stud 43. Upward and downward motion is provided by a lifting cam 44. A stop motion cam 45 (FIG. 5) enables the unit to pickup an individual seal for transfer to the mouth of a container in known fashion. Thus motion is transmitted through a swivel block 46 (FIG. 8) which transmits motion from a cam follower 47 to a cam follower fork 48. The swivel block is in the form of a bell crank. A shaft key 50 limits the reciprocal motion of the combination vacuum and heater head 51. The upward and downward motion is provided by a pair of rollers 52 and 53 which engage a track 54 positioned by a support member 55, depending from horizontal member 56.

The head 51, best seen at the lower part of FIG. 2, includes a vacuum chamber 61 communicating with longitudinal bores 62. An offset bore 63 supports a thermocouple 64 having leads 65 to a computer control (not shown) which regulates the sealing heat within prescribed limits. A vacuum line 66 is fed from a vacuum slip ring (not shown) of known type. A peripheral heater band 67 is of resistive type, and is powered by an individual electric slip ring pair (not shown), also known in the art.

Figure 3:
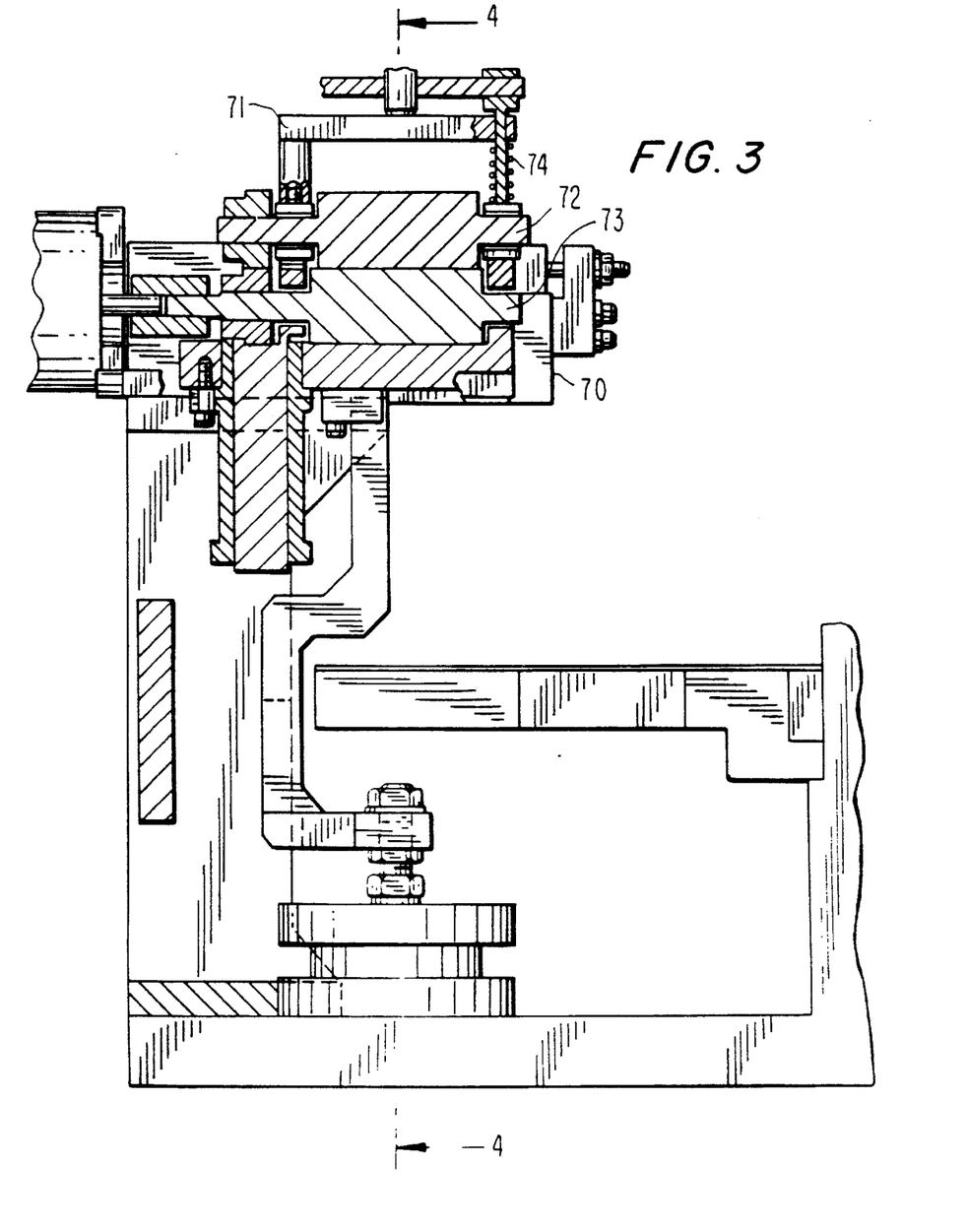
FIG. 3 is a fragmentary enlarged vertical sectional view, partly in elevation, showing a die and foil feed assembly.
Figure 4:
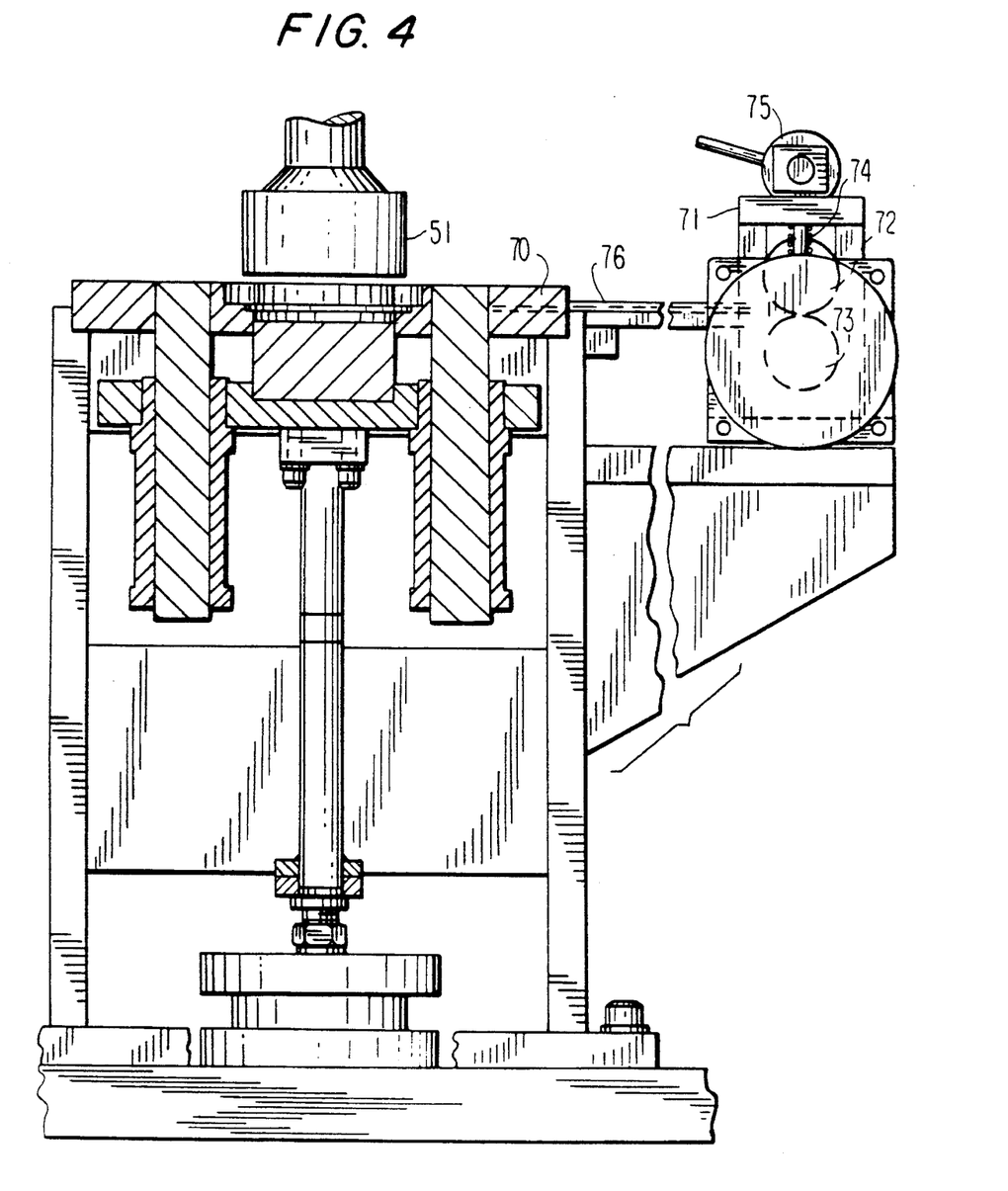
FIG. 4 is a fragmentary enlarged vertical sectional view of the die and foil feed assembly as seen from the plane 4—4 in FIG. 3.

Referring to FIG. 3, there is illustrated a foil feed assembly which includes a pneumatically operated punch and die which delivers individual seals to be picked up by individual sealing heads. It includes a web supporting platform 70, a web advance element 71, having first and second powered rollers 72 and 73 tensioned together by a spring 74 and a manually operated cam 75. A foil web 76 is advanced incrementally in known fashion.

Figure 7:
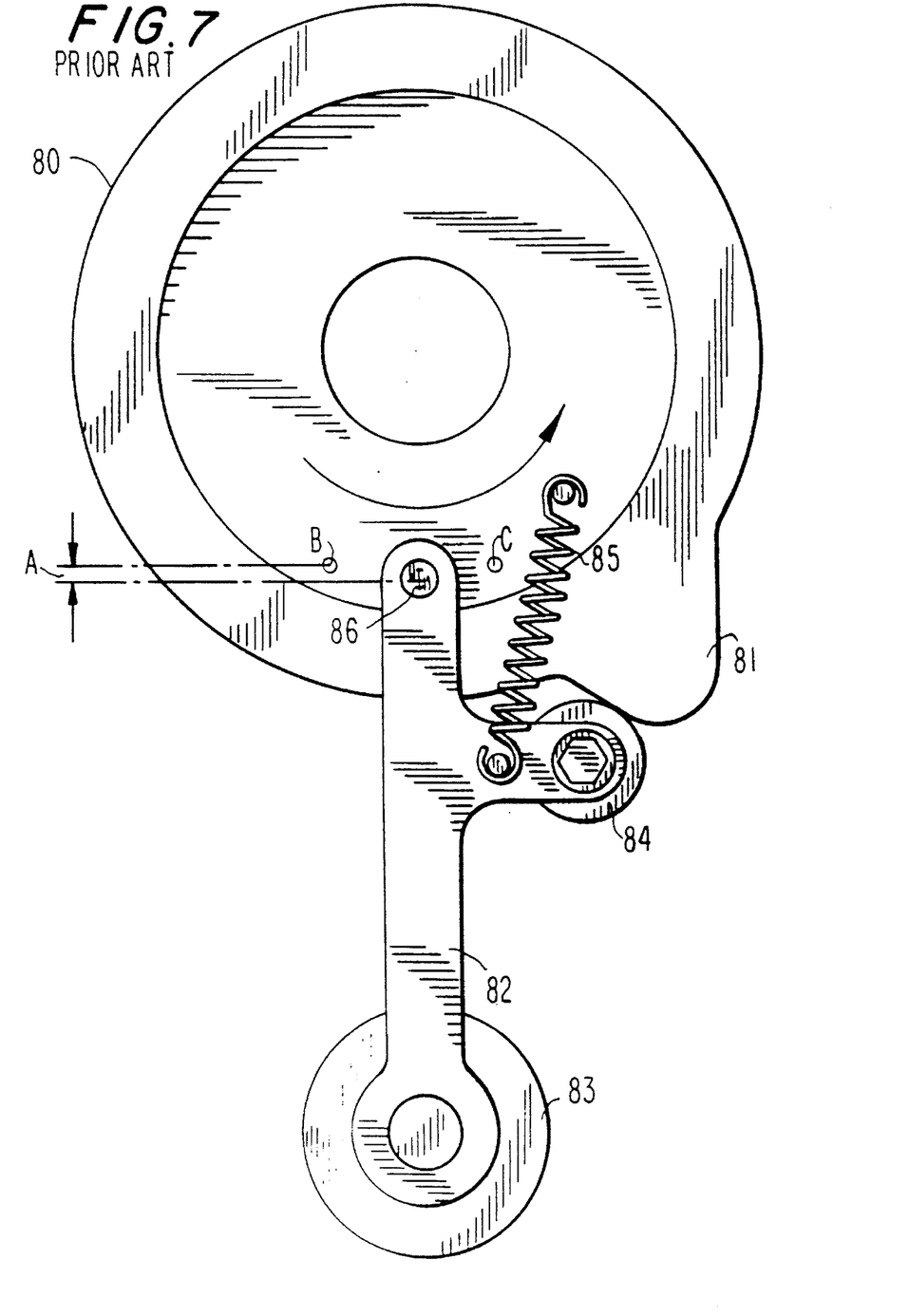
FIG. 7 is a fragmentary horizontal schematic view showing a prior art heater head stop mechanism.

As mentioned above, the picking up of an individual seal by a heater head has been accomplished in the prior art in a less than perfect fashion. FIG. 7 schematically illustrates the problem. In order to pick up a seal, it is necessary to momentarily halt arcuate motion of the individual head while the pocket wheel continues to rotate. The head must pick up the seal executing vertical motion alone, and thereafter "catch up" with the pocket wheel location before applying the seal to the container disposed therebeneath. Thus, using prior art structure, a stationary cam plate 80 mounts a cam 81. A heater head holding dial pivotally supports a heater head holder 82 carrying a heater head 83 at a free end thereof; a cam follower 84 is urged against the cam 81 by a spring 85 until it passes the high point on the cam, following which the heater head returns to its normal arcuate position.

It will be observed that the pivot point 86 is continuously moving in an arcuate path during the above-described movement, and thus creates an error A as it moves from point "B" to point "C" resulting in the head on occasion picking up a seal which is displaced with respect to this own vertical axis.

Figure 8:
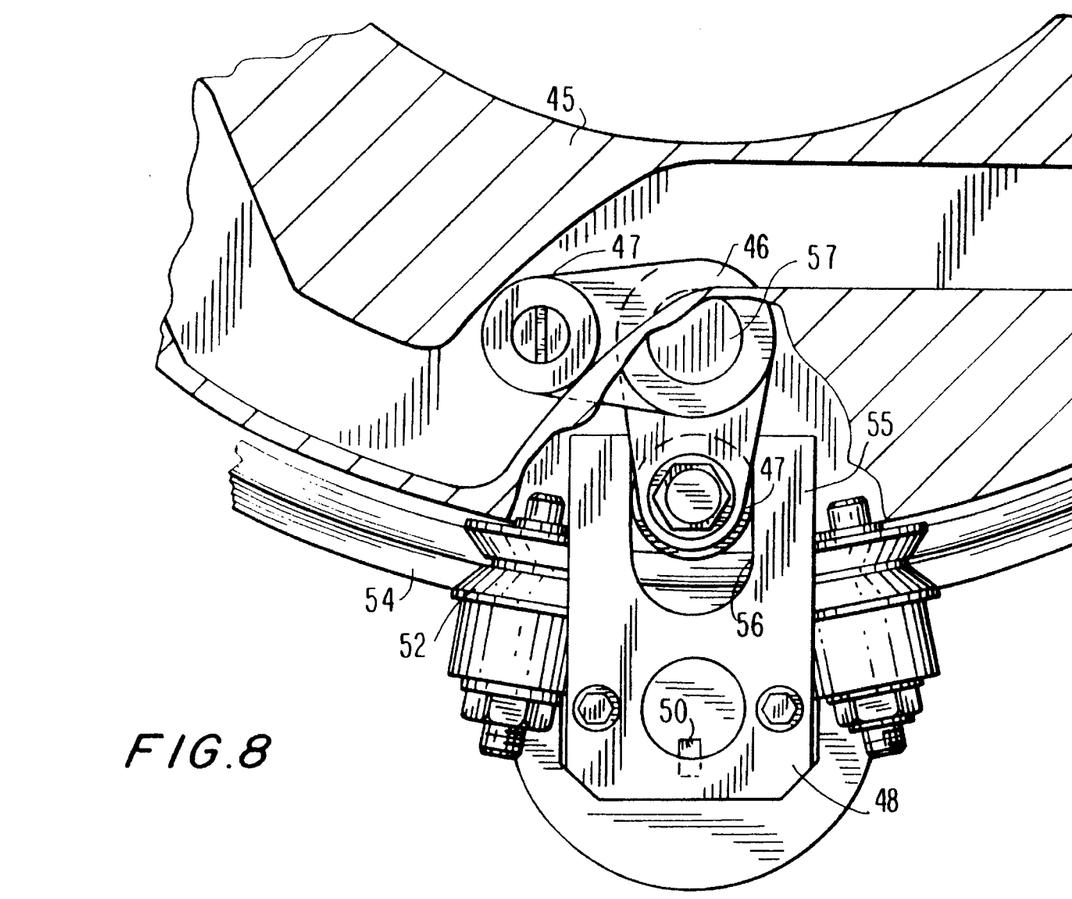
FIG. 8 is a fragmentary horizontal view of the corresponding heater head stop mechanism in accordance with the present invention.

FIG. 8 illustrates an improved structure contemplated by the present invention. In this view, the turret is moving in a clockwise direction. The cam 45 is fixed. The heater head 51 is guided on a circular track 54 as described above, and moves freely on the supporting rollers 52–53. The cam follower 47 engages a fork 55 having a slot 56 mounted in fixed relation relative to the heater head. While the pivot point 57 executes the same arcuate path of travel as before, the slot 56 provides lost motion in a radial direction only so that the heater head at all times remains in its arcuate path of motion and is arcuately positioned to receive a seal from the seal supply means.

During operation, the die cutting assembly operates in conjunction with the heater head. When the air cylinder receives a signal, it moves the punch upwardly to cut a seal from the web and position the separated seal approximately 0.010 inch from the lower surface of the heater head to be picked up under vacuum.

Two conditions must be satisfied before the air cylinder will operate. There must be a container in position in the pocket element to receive the seal, and the heater head must be above the die. If these conditions are not satisfied, the die will skip this station, and the seal material will not be indexed forward.

Figure 5:
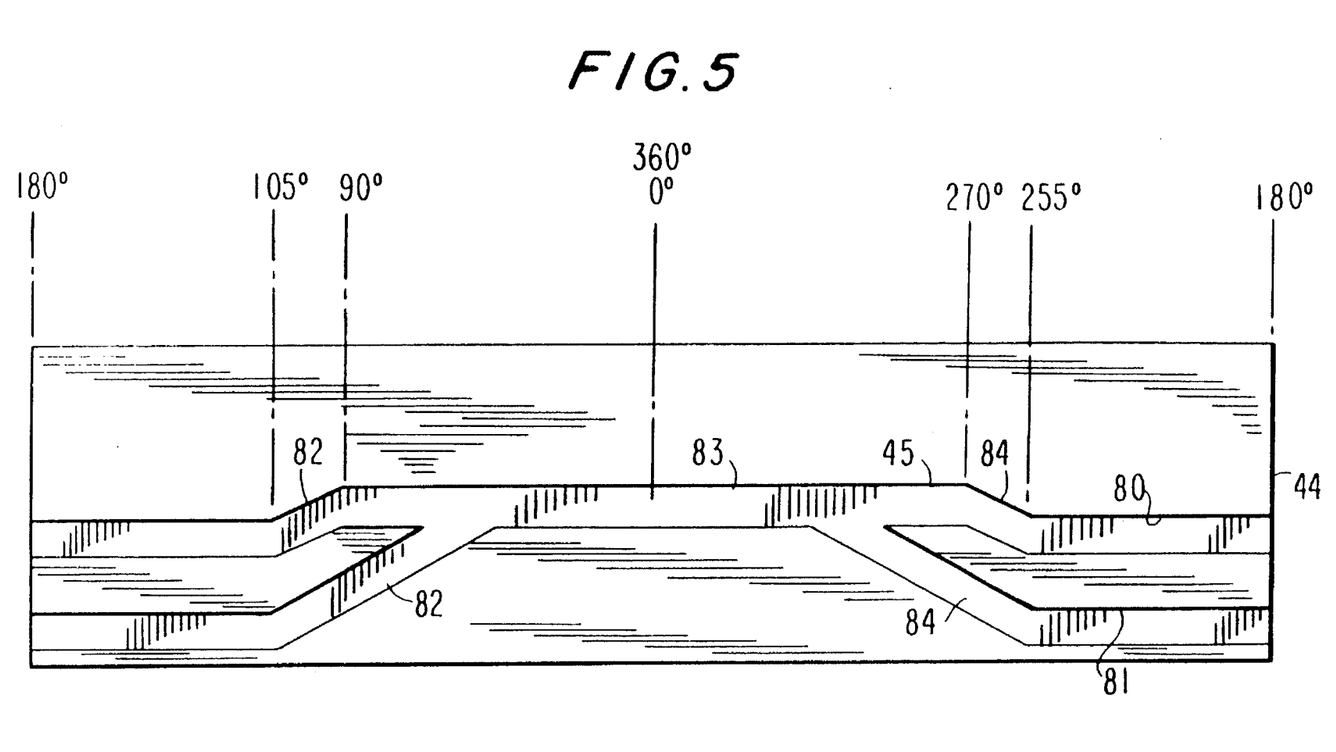
FIG. 5 is a fragmentary side elevational view of a heater head lifter cam.
Figure 6:
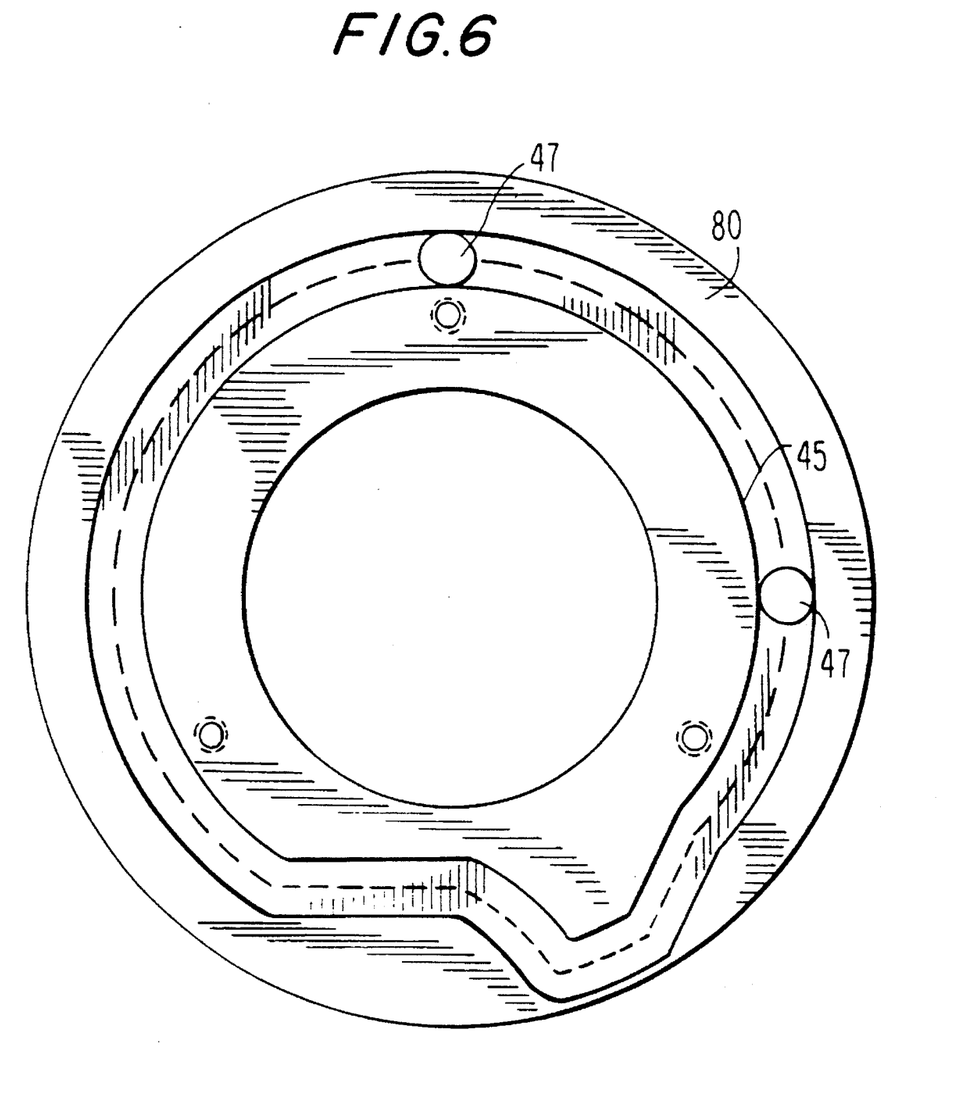
FIG. 6 is a top plan view of a stop motion cam.

Referring to FIG. 5 in the drawing, the lifter cam 44 is illustrated in greater detail. As distinguished from prior art lifter cams, the present construction provides first and second cam tracks 80 and 81 which are continuous over 360 degrees except for the sector illustrated. Each track includes a lift portion 82, a cam dwell portion 83 and a fall portion 84. Where relatively taller containers are being sealed, the upper track is employed. Where shorter containers are sealed, the lower track is used. In each case, the track not being used is blocked by inserts (not shown).

Should the device stop operation for any reason, the heater heads cannot be allowed to remain in contact with plastic containers, as this would result in melting or deforming the neck of the containers. To prevent this, the air cylinder 90 is energized resulting in lifting arm 91 transmitting a lifting motion through lifting stud 93 and drum cam 45. Operation of the air cylinder is controlled by computer means including the heater band thermocouple.

We wish it to be understood that we do not consider the invention to be limited to the precise details of structure shown and set forth in the specification, for obvious modifications will occur to those skilled in the art to which the invention pertains.

We claim:

1. In an apparatus for applying and sealing a thin flexible sheet-like disc to the top rim of an upwardly opening container, said apparatus including a turret means rotatable about a substantially vertical axis, the turret means including a pocket wheel for guiding said containers about an arcuate path of travel during which said seals are seated and sealed by vertically reciprocating disc applying and sealing vacuum heads, means supplying individual discs to said heads, and heating means for actuating adhesive coatings on said seals, the improvement comprising: said vacuum heads each including a unitary electric band heater positioned at the periphery thereof, and at least one thermocouple for sensing the instantaneous temperature at said periphery, and temperature controller means responsive to said thermocouple for regulating the flow of power to said vacuum heads.

2. The improvement in accordance with claim 1, further comprising: interconnected alarm means actuated when the temperature in an individual head exceeds a specified range for interrupting operation of said apparatus.

3. The improvement in accordance with claim 1, further comprising: means for supplying vacuum to individual heads in accordance with a predetermined cycle, and means for interrupting the operation of said apparatus upon the occurrence of vacuum below a predetermined level.

4. In an apparatus for applying and sealing a thin flexible sheet-like disc to the top rim of an upwardly facing container including a turret means continuously rotatable about a substantially vertical axis, the turret means including a pocket wheel receiving containers and guiding the same through an arcuate path of travel during which said seals are positioned and sealed by vertically reciprocating disc applying and sealing vacuum heads, said vacuum heads having camming means for momentarily halting arcuate movement with respect to said turret means to enable the engagement of a seal prior to application to a container, the improvement comprising: said camming means including a cam surface fixed in position relative to said turret means, a pivotally mounted cam follower carried by said turret means, a radially extending camming fork carried by said sealing head, said cam follower means having lost motion means interconnecting with said camming fork wherein arcuate motion is transmitted in the absence of radially directed motion.

5. The improvement in accordance with claim 4, said pivotally mounted cam follower being in the form of a bell crank, forming a first leg contacting said fixed cam, and a second leg slidably engaging said camming fork on said sealing head.

6. In an apparatus for supplying and sealing a thin flexible sheet-like disc to the top rim of an upwardly facing container including a turret means continuously rotatable about a substantially vertical axis, the turret means including a pocket wheel for receiving containers and guiding the same through an arcuate path of travel during which said seals are positioned and sealed by vertically reciprocating disc applying and sealing vacuum heads on said turret means, the improvement comprising: a selective height adjustment system to accommodate containers of differing heights mounted upon said turret means for rotation therewith, said system including air cylinder means for vertically raising said vacuum heads from operational position upon the occurrence of interruption of operation.

7. The improvement in accordance with claim 6, including sensing means controlling said air cylinder means for detecting a gap in the flow of containers to said turret means, and determining the presence of temperature in a sealing head outside predetermined limits.

* * * * *